US011099523B1

(12) United States Patent
Gatt

(10) Patent No.: US 11,099,523 B1
(45) Date of Patent: Aug. 24, 2021

(54) DIGITAL HOLOGRAPHY RANGE DOPPLER RECEIVER

(71) Applicant: LOCKHEED MARTIN CORPORATION, Bethesda, MD (US)

(72) Inventor: Philip Gatt, Berthoud, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 280 days.

(21) Appl. No.: 16/420,022

(22) Filed: May 22, 2019

(51) Int. Cl.
  *G03H 1/04*   (2006.01)
  *G01B 9/02*   (2006.01)
  *G03H 1/08*   (2006.01)

(52) U.S. Cl.
  CPC ....... *G03H 1/0443* (2013.01); *G01B 9/02032* (2013.01); *G01B 9/02045* (2013.01); *G01B 9/02047* (2013.01); *G03H 1/0866* (2013.01); *G03H 2001/046* (2013.01); *G03H 2001/0452* (2013.01); *G03H 2001/0883* (2013.01)

(58) Field of Classification Search
  CPC .............. G03H 1/0443; G03H 1/0866; G03H 2001/0452; G03H 2001/0883; G03H 2001/046; G01B 9/02045; G01B 9/02032; G01B 9/02047
  See application file for complete search history.

(56) References Cited

U.S. PATENT DOCUMENTS

| | | | | |
|---|---|---|---|---|
| 2006/0262319 A1* | 11/2006 | Gatt | ........................ | G01H 9/00 356/492 |
| 2011/0037965 A1* | 2/2011 | Hintz | ................... | G06K 9/3241 356/4.01 |
| 2015/0292858 A1* | 10/2015 | Atlan | ................... | G03H 1/0866 356/457 |
| 2018/0180723 A1* | 6/2018 | Sebastian | ................. | G06T 7/70 |

OTHER PUBLICATIONS

Jason Stafford, Demonstration of Range & Doppler Compensated Holographic Ladar, Jun. 2016, Lockheed Marting Conference, pp. 1-16 (Year: 2016).*

* cited by examiner

*Primary Examiner* — Michael P LaPage
(74) *Attorney, Agent, or Firm* — Morgan, Lewis & Bockius LLP

(57) ABSTRACT

Systems and methods are provided for a digital holography range Doppler receiver. The subject system transmits outgoing electromagnetic radiation to a target, and provides a first reference local oscillator (LO) beam to a first detector and a second reference LO beam to a second detector, based on the outgoing electromagnetic radiation. The system receives reflected electromagnetic radiation from the target through a first optical receiver and a second optical receiver having a smaller diameter, and determines range and velocity of the target simultaneously using an interference with the second reference LO beam. The system applies time and frequency offsets to the first reference LO beam based on the measured range and velocity to align the first reference LO beam with the reflected electromagnetic radiation, and produces an image of the target using the first reference LO beam having the applied time and frequency offsets.

20 Claims, 7 Drawing Sheets

DIGITAL HOLOGRAPHY RANGE DOPPLER RECEIVER

STATEMENT REGARDING FEDERALLY SPONSORED RESEARCH OR DEVELOPMENT

Not applicable.

FIELD

The present disclosure generally relates to laser radar imaging systems, and more particularly, to Digital Holography (DH) imaging.

BACKGROUND

Light detection and ranging (lidar) and laser detection and ranging (ladar) systems, hereafter collectively referred to as ladar systems, are remote sensing systems that send light from a transmitter to a target, detect light scattered from the target using a receiver, and infer properties about the target from the detected light. Inferred properties may include 2D and 3D target image, range, velocity, vibration, material, and other parameters. Ladar systems use either direct detection or coherent detection schemes for detection of the scattered light. Direct detection ladar systems do not incorporate a reference beam and only measure the reflected field's irradiance. In contrast, coherent detection systems include a receiver that incorporates a local oscillator (LO) beam of light that is mixed with the received light to produce a signal proportional to the coherent addition of the LO electric field and the signal field. Typically, the LO field is constant and the resultant signal is proportional to the target reflected field rather than it's reflected irradiance, which is what is measured when the LO field is not present. Thus, coherent receivers sense both field amplitude and phase. Access to field phase enables many measurements and ladar architectures not available to direct detection lidar including Doppler-velocity, vibrometry, synthetic and multi-aperture ladar and wavefront sensing.

Many ladar systems that operate in the field, for example, from aircraft, are severely limited in the amount of space they can occupy and the electrical power they can draw from the aircraft. In addition, operation with the greatest possible sensitivity is essential. Furthermore, operational scenarios in current and future systems place a high premium on transmitter and/or receiver multi-functionality, such that it is highly desirable for a single installed system to be capable of carrying out multiple measurements with high efficiency. This is particularly the case where size, weight, power, and cost (SWPaC) are at a premium, as is the case in land-based vehicles, aircraft, aircraft pods, UAVs (unmanned aerial vehicles), MAVs (micro air vehicles), and satellite payloads. This trend to improved SWPaC is anticipated to continue with a desire to increase the multi-functionality of the measurement systems.

Digital holography (DH) is a form of coherent detection ladar, where the object or target is flood-illuminated with a laser signal and the reflected light (or the returned laser signal) from the target is detected by an array of detectors located in an image plane of an optical system. The reflected light is interfered with one or more off-axis reference beams (e.g., local oscillators) to form holograms on the focal plane array. The recorded holograms have interference fringes with an orientation corresponding to the pupil plane lateral geometry of the local oscillators relative to the receiver aperture. Of particular interest is remote sensing applications where everyday objects (e.g., vehicles, buildings, and people) are observed at moderate to long standoff distances (e.g., from a few meters to many kilometers). These tactical DH systems require a-priori target range and velocity knowledge to enable good temporal and spectral overlap between the return signal and the reference (LO) beams.

SUMMARY

The subject technology provides for a novel, compact and low-cost solution to the range Doppler (RD) sensing problem used in prior approaches. The subject technology includes a single-pixel, wide-bandwidth, coherent ladar receiver. The subject technology utilizes digital holography transceiver hardware with the addition of 1) a small (~100× smaller) receiver aperture, and 2) a single-element wideband detector to simultaneously measure target range and instantaneous frequency (or Doppler velocity). This minimizes sensor optics (e.g., apertures, etc.) and eliminates the need for a second laser source to implement this critical measurement function required by tactical digital holography transceivers.

In one embodiment of the subject technology, an optical system includes a digital holography (DH) system comprising a first optical receiver and a first detector, in which the DH system is configured to provide a first reference local oscillator (LO) beam signal to the first detector, receive reflected electromagnetic radiation from the target at the first detector through the first optical receiver. The optical system includes a range Doppler system comprising a second detector, in which the RD system is configured to provide a second reference LO beam signal to the second detector, receive the reflected electromagnetic radiation from the target at the second detector, determine simultaneously range and velocity of the target from the reflected electromagnetic radiation using an interference with the second reference LO beam signal, and apply time and frequency offsets to the first reference LO beam signal based on the range and velocity of the target to align the first reference LO beam signal with the reflected electromagnetic radiation at the first detector. In some aspects, the DH system produces an image of the target using the reflected electromagnetic radiation and the first reference LO beam signal having the applied time and frequency offsets.

In one embodiment of the subject technology, a method includes transmitting outgoing electromagnetic radiation to a target; providing a first reference local oscillator (LO) beam signal to a first detector and a second reference LO beam signal to a second detector, based on the outgoing electromagnetic radiation; receiving reflected electromagnetic radiation from the target at the first detector through a first optical receiver and at the second detector through a second optical receiver having a diameter smaller than that of the first optical receiver; determining simultaneously range and velocity of the target from the reflected electromagnetic radiation using an interference with the second reference LO beam signal; applying time and frequency offsets to the first reference LO beam signal based on the range and velocity of the target to align the first reference LO beam signal with the reflected electromagnetic radiation at the first detector; and producing an image of the target using the reflected electromagnetic radiation interfered with the first reference LO beam signal having the applied time and frequency offsets.

In one embodiment of the subject technology, an optical transceiver includes an optical transmitter configured to generate outgoing electromagnetic radiation and transmit the outgoing electromagnetic radiation to a target; a first optical receiver; a first optical detection system optically coupled to the first optical receiver and configured to receive a first reference local oscillator (LO) beam signal; receive reflected electromagnetic radiation from the target through the first optical receiver; interfere the reflected electromagnetic radiation with a first reference LO beam signal; a second optical receiver; a second optical detection system optically coupled to the second optical receiver and configured to receive the reflected electromagnetic radiation from the target through the second optical receiver; measure simultaneously range and velocity of the target from the reflected electromagnetic radiation using an interference with a second reference LO beam signal; generate receiver data comprising time and frequency offsets based on the measured range and velocity of the target; and a controller coupled to the second optical detection system and configured to apply the time and frequency offsets from the receiver data to the first reference LO beam signal to align the first reference LO beam signal with the reflected electromagnetic radiation, wherein the first optical detection system produces an image of the target using the reflected electromagnetic radiation interfered with the first reference LO beam signal having the applied time and frequency offsets.

DETAILED DESCRIPTION

Figure 1:
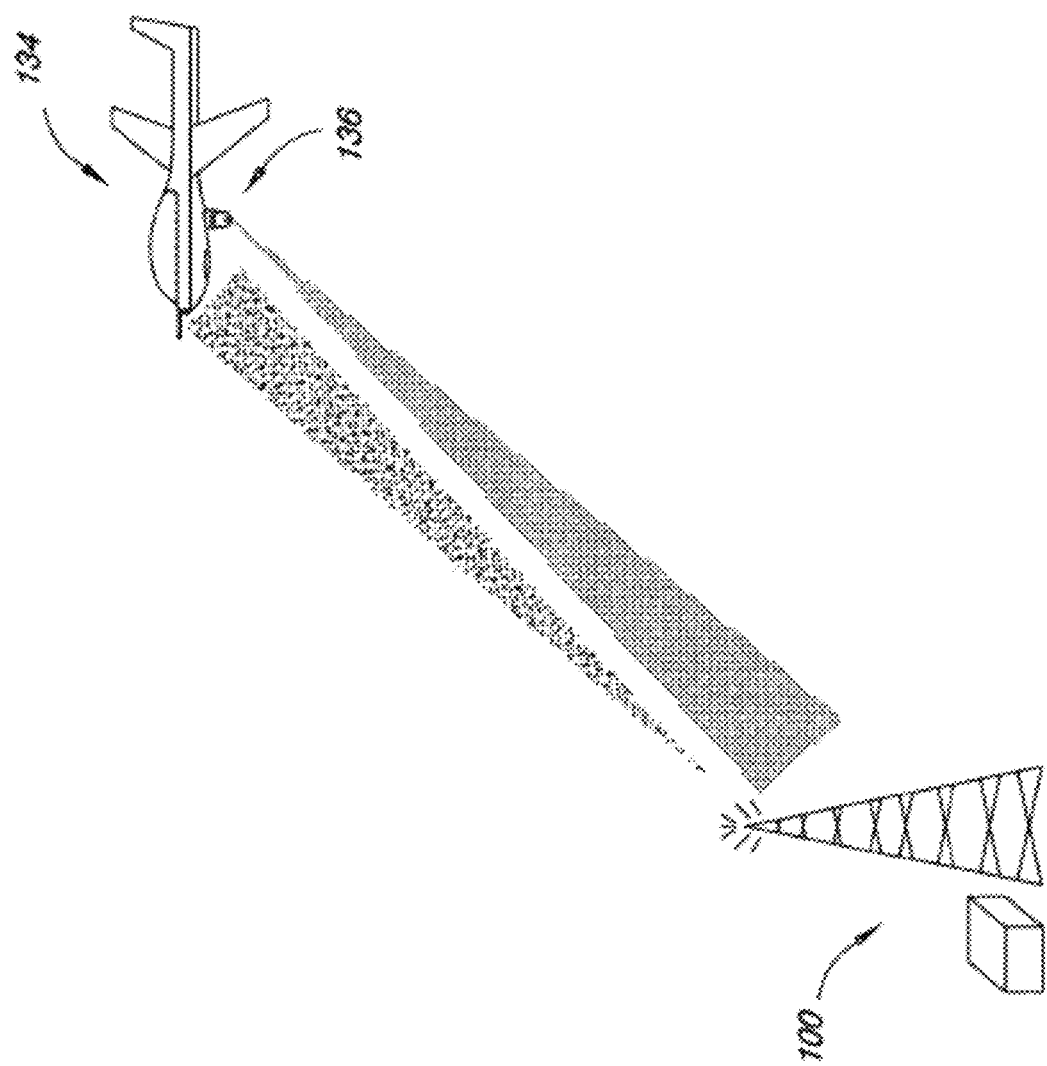
FIG. 1 conceptually illustrates an example of a free space optical communication system in accordance with one or more implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

DH imaging laser radar sensors can only sense targets in a single range-Doppler (RD) bin. Consequently, DH laser radar sensors need to be paired with a range and velocity sensor to cue the DH receiver. Various approaches to solve the problem of estimating target range (pulse time delay) and velocity (pulse Doppler shift or frequency delay) can be envisioned. One approach includes augmenting the DH transceiver (transmitter+receiver) with an independent laser range finder system to estimate range and range-rate. Here, the independent laser range finger system measures target range with a time-of-flight laser system. Velocity (range-rate) is inferred by estimating the change in target range over several independent pulses. This is called range-rate estimation as opposed to direct Doppler sensing, where the frequency (color) of the light (or electromagnetic radiation) is directly measured using a coherent receiver.

The problem with this approach is that it requires a separate, independent lidar system, which can be bulky in size, expensive and a significant consumer of power. In fact, because laser range finder receivers are often not as sensitive as a coherent detection receiver, the power and aperture requirements can exceed that of the digital holography system itself. In addition to the digital holography laser and optics, this separate sensor requires a secondary large aperture, and a secondary laser source. Furthermore, the prior approaches utilizing direct detection laser range finders do not directly measure target velocity. Instead, the target velocity is estimated using multiple pulse echoes to measure range-rate and infer instantaneous velocity. This approach requires at least two, but often more, pulses to estimate target velocity, which requires additional time.

The subject technology alleviates many of the inefficiencies of the prior approaches. For example, the subject technology includes a coherent receiver that includes simultaneous range and Doppler, which is insensitive to high-energy-laser (HEL) beam backscatter and background light, and the dual balanced coherent receiver minimizes LO power requirements and maximizes signal efficiency. The subject technology does not require a separate laser source, but instead relies on the DH imager laser to provide the active illumination needed. Thus, a single laser source is used for both DH and RD receiver functions. The subject technology also includes a small bistatic receiver that has minimal SWPaC impact, which is sized to a single speckle for longest range target, and can see at least as far as the digital holography system (and potentially further with more pulse averaging). The subject technology is also wide-bandwidth, which enables monitoring of temporal phase noise, and includes wideband Doppler sensing. Furthermore, as described below, the Range-Doppler receiver telescope can be quite small compared to the DH receiver telescope.

FIG. 1 conceptually illustrates an example of a free space optical communication system that includes a ground communication apparatus 100 and a free space optical communication apparatus 136 mounted on an unmanned aerial vehicle (UAV) 134. Free space optics (FSO) is a telecommunication technology that uses electromagnetic radiation propagating in free space to transmit data between two points. The technology can be useful where the physical connection of the transmit and receive locations is difficult. For example, in cities, the laying of fiber optic cables can be expensive and, in some instances, impractical based upon the infrastructure already built. FSO can also be used to communicate between spacecraft, since outside of the atmosphere there is little to distort the signal. Such systems can also be used in aircraft if the system is designed to track the position of the first location (e.g., the vehicle) with respect to the position of the second location (e.g., a ground station receiver or transceiver). In some instances, the optical links use infrared laser electromagnetic radiation. Communication is also possible using electromagnetic radiation emitting diodes (LEDs) or other electromagnetic radiation sources, in some systems. The beams of electromagnetic radiation in FSO systems are transmitted by electromagnetic radiation focused on receivers. These receivers can, for example, be telescopic lenses able to collect the photon stream and transmit digital data.

In some implementations, the ground communication apparatus 100 can be a stationary free space optical communication apparatus that can receive high speed data transmissions and also transmit a beacon signal. In addition, the ground communication apparatus 100 can, in some instances, be mounted to an air field tower, where the tower and the ground communication apparatus are relatively permanent.

In some implementations, the ground communication apparatus 100 can be portable, so that the ground communication apparatus 100 can be transported to a location and can receive data transmissions from a free space optical communication apparatus 136 in and/or around the location. For example, the ground communication apparatus 100 can be mounted to an automobile vehicle, and a UAV 134 can be sent to collect video images of the area around the vehicle. In such implementations, the communication can then be carried on between the aerial vehicle, the automobile, and/or one or more other (e.g., remote) ground or aerial communications apparatuses.

In some implementations, a beacon signal can be received by the free space optical communication apparatus 136 mounted on the UAV 134. The beacon signal can be received by the free space optical communication apparatus 136 and used to track the ground communication apparatus 100, as described further herein. In some implementations, the free space optical communication system of FIG. 1 may also represent a tactical DH system providing ground target imagery, as is discussed further below with respect to FIG. 4. Many of the components in a DH system are common to a free space optical communication system.

Figure 2:
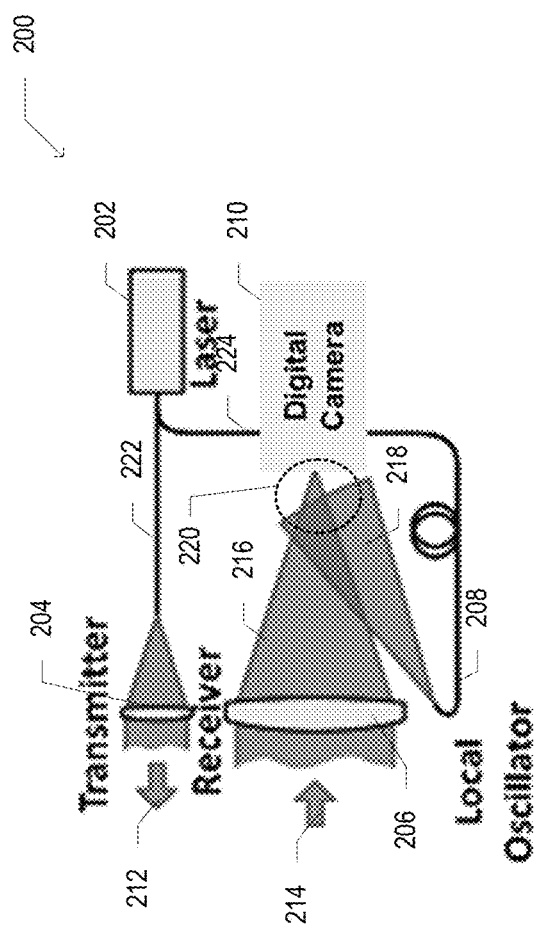
FIG. 2 conceptually illustrates a simplified diagram of a digital holography system.

FIG. 2 conceptually illustrates a simplified diagram of a digital holography system 200. In some implementations, the free space optical communication apparatus 136 of FIG. 1 is, or includes at least a portion of, the digital holography system 200. The digital holography system 200 uses an image-plane recording geometry. The digital holography system 200 includes a coherent optical signal source 202 (depicted as "Laser"), an optical transmitter 204, an optical receiver 206, a local oscillator (LO) generator 208, and a detector 210 (depicted as "Digital Camera").

As depicted in FIG. 2, optical signal from the coherent laser source 202 is split between two beam paths, where a first beam path 222 is used for illuminating an object (not shown) and a second beam path 224 is used for forming a holographic reference. The holographic reference may correspond to a reference LO beam 218 produced by the LO generator 208. The optical signal carried on the first beam path 222 interacts with the optical transmitter 204 to form outgoing optical signal 212 that is directed to be illuminated onto the object.

The optical receiver 206 collects a return optical signal 214 that is scattered by the object to form collected optical signal 216 and interferes the collected optical signal 216 with the reference LO beam 208 to form a hologram interference pattern 220. The hologram interference pattern 220 is then recorded by the detector 210 or a focal plane array (not shown).

This detection process, which interferes an off-axis reference LO beam (e.g., 218) with the image (e.g., the collected optical signal 216 of the object), is known as spatial heterodyne and is part of a larger detection methodology called coherent detection. Coherent detection receivers provide access to image amplitude and phase as opposed to conventional imaging, which only records image intensity. Having access to image amplitude and phase enables many imaging modalities including 3D, synthetic aperture, vibration imaging, and others.

Although FIG. 2 shows one embodiment of a DH system, there are other DH geometries (e.g., pupil-plane recording geometry, temporal rather than spatial heterodyne, etc.) that may apply to provide coherent detection. The components that may be common among the different DH geometries include a transmit laser (e.g., 202), a local oscillator laser (e.g., 208) and a digital camera (e.g., 210).

Figure 3:
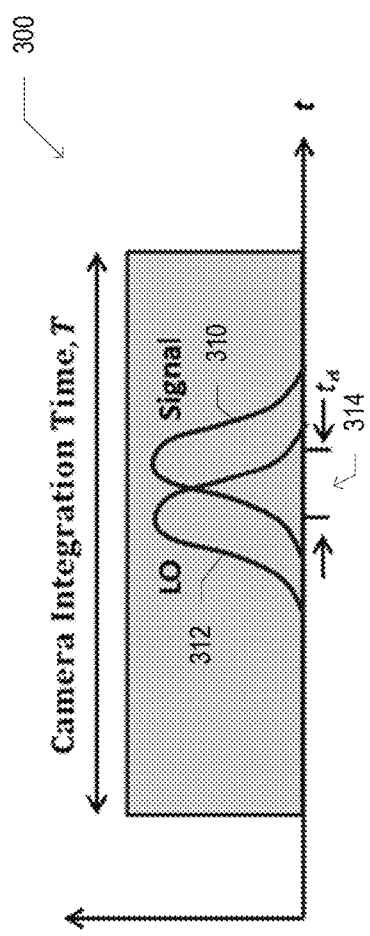
FIG. 3 conceptually illustrates an example of camera integration process of two pulses separated by a time delay.

FIG. 3 conceptually illustrates a plot depicting an example of a camera integration process 300. The camera integration process 300 shows two pulses (e.g., 310, 312) separated by a time delay 314. In many long-range ladar applications, the transmitted optical signal waveform is pulsed (hereinafter "the transmit signal pulse 310"). In some implementations, the transmitted optical signal waveform corresponds to the outgoing optical signal 212 of FIG. 2. In this respect, the transmit signal pulse 310 can correspond to a pulse waveform of the outgoing optical signal 212. For these pulsed applications, the reference beam is also pulsed (hereinafter "the LO reference pulse 312"). In some implementations, the reference beam corresponds to the reference LO beam 218 of FIG. 2. In this respect, the LO reference pulse 312 can correspond to a pulse waveform of the reference LO beam 218.

For maximal efficiency, the time-delay of the LO reference pulse 312 needs to be matched to the anticipated time-of-arrival of the transmit signal pulse 310. Typical pulse lengths are in a range of 50 ns to 500 ns. The extent to which the transmit signal pulse 310 and the LO reference pulse 312 overlap in time influences the overlap efficiency. If there is no overlap of the transmit signal pulse 310 and the LO reference pulse 312, then the efficiency is zero. With near perfect overlap, the efficiency can approach unity. Likewise, the LO reference pulse 312 needs to be frequency tuned, with respect to the transmit signal pulse 310, to match the anticipated frequency Doppler shift imparted on of the transmit signal pulse 310 due to relative target motion. Consequently, the LO reference pulse 312 needs to be matched in shape, time and frequency to a received signal pulse (that corresponds to a pulse waveform of the return optical signal 214) if reasonable mixing efficiency is to be achieved.

A transmit laser (e.g., the outgoing optical signal 212 of FIG. 2) does not necessarily need to be pulsed, which is a form of amplitude modulation (AM). The outgoing optical signal 212 can be a continuous wave (CW) (i.e. no modulation) in some implementations, or the outgoing optical signal 212 can be a phase modulated CW in other implementations. Regardless of the type of modulation used, the DH LO (e.g., the reference LO beam 218) can be identically modulated and time-frequency shifted to match the time-delay 314 and Doppler frequency shift of the return optical signal 214.

Figures 4, 5:
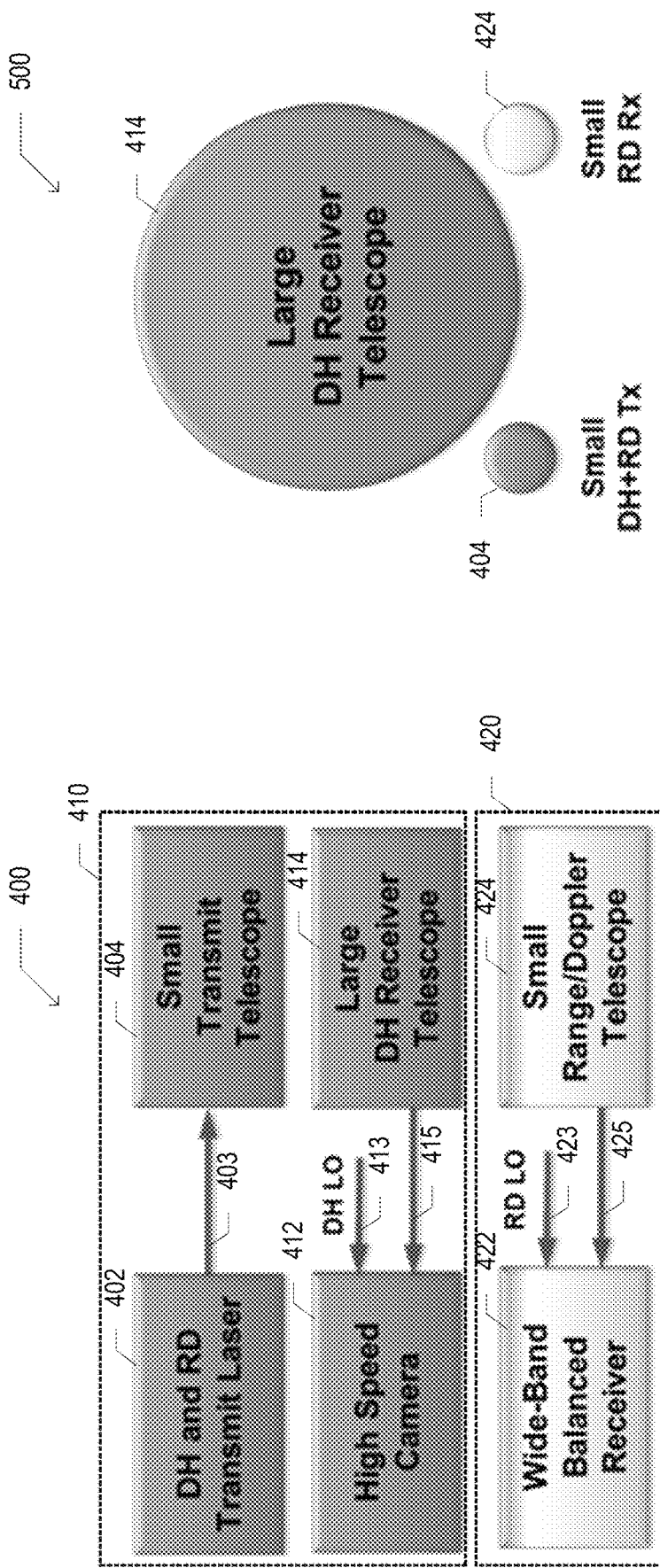
FIG. 4 illustrates a block diagram of an example of a range Doppler receiver system in accordance with one or more implementations of the subject technology.
FIG. 5 conceptually illustrates a front view of the subject range Doppler receiver system in accordance with one or more implementations of the subject technology.

FIG. 4 illustrates a block diagram of an example of a ladar transceiver system 400 including a range-Doppler receiver system 420 in accordance with one or more implementations of the subject technology. The components and/or modules as shown in FIG. 4 can vary in number depending on implementation, and are not intended to limit the scope of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The ladar transceiver system 400 includes a digital holography transceiver subsystem 410 and a range-Doppler subsystem 420. The digital holography subsystem 410 includes an optical signal source 402 and an optical transmitter 404 on a transmit path of the digital holography transceiver subsystem 410, and a first optical receiver 414 and a first receiver 412 on a receive path of the digital holography transceiver subsystem 410. The range-Doppler receiver subsystem 420 includes a second optical receiver 424 and a second electronic receiver 422.

In some aspects, the optical signal source 402 is optically coupled to the optical transmitter 404, and the first optical receiver 414 is optically coupled to first receiver 412. The second optical receiver 424 is optically coupled to second electronic receiver 422. The graphic shown in FIG. 4 is one embodiment of the subject technology. However, other optical topologies may be implemented for the ladar transceiver system 400. For example, the second electronic receiver 422 may be optically coupled to the optical transmitter 404, such that the second electronic receiver 422 shares the optical transmitter 404 used by the optical signal source 402. In other implementations, the second electronic receiver 422 may be optically coupled to the first optical receiver 414, such that the second electronic receiver 422 shares the first optical receiver 414 used by the first receiver 412. In some aspects, the optical transmitter 404 includes a telescope. In some aspects, the first receiver 412 is a high-speed digital camera. In this respect, the first receiver 412 may include a charge coupled device. In other examples, the first receiver 412 may include an array of photodetectors (e.g., 512×512).

The ladar transceiver system 400 utilizes digital holography transceiver hardware with the addition of 1) a small RD receiver aperture (e.g., about 100× smaller than the DH receiver aperture), and 2) a wideband detector to simultaneously measure target range and instantaneous frequency (or Doppler velocity). In some implementations, the wideband detector is a single-element detector. In other implementations, the wideband detector is a dual-balanced receiver.

In some implementations, the optical signal source 402 serves as a laser source for both DH and RD functions. In this respect, the RD transmitter does not require separate laser source, but instead relies on a single laser beam to provide the active illumination needed for both DH and RD receiver functions. This minimizes sensor optics (e.g., apertures, etc.) and eliminates the need for a second laser source to implement this critical measurement function required by tactical digital holography transceivers. In some implementations, the optical signal source 402 provides a CW laser beam to the optical transmitter 404 for optical transmission to a target (not shown).

In some implementations, the second optical receiver 424 includes a telescope that has a smaller aperture size compared to the first optical receiver 414. As depicted in FIG. 4, the range-Doppler subsystem 420 employs a small-aperture telescope (e.g., 424), which is separate from the large-aperture DH receiver telescope (e.g., 414), to collect a small amount of the return optical signal and to interfere the return optical signal with a CW reference beam (e.g., RD LO reference beam 423). Because of this interference, the detection process by the range-Doppler subsystem 420 is coherent and both the time-of-arrival (TOA) and frequency (e.g., Doppler shift) of the detected pulse can be measured directly from a single received pulse. The second optical receiver 424 may be a simple lens in some implementations, or may include multiple optical elements in other implementations.

In some implementations, the second electronic receiver 422 includes a small bistatic receiver that has minimal SWPaC impact, which is sized to a single speckle for longest range target, and can detect objects at least as far as the digital holography system (and potentially further with more pulse averaging). For example, the second electronic receiver 422 may be a single-pixel, wide-bandwidth, coherent ladar receiver. In other implementations, the second electronic receiver 422 includes a dual balanced coherent receiver that includes simultaneous range and Doppler detection, which is insensitive to HEL beam backscatter and background light, and the dual balanced coherent receiver minimizes LO power requirements and maximizes signal efficiency.

In operation, the first receiver 412 receives a DH LO beam signal 413 and interferes the DH LO beam signal 413 with return optical signal 415 from the first optical receiver 414. The first receiver 412 may utilize the DH LO beam signal 413 to match the target velocity and range. Similarly, the second electronic receiver 422 receives a RD LO beam signal 423 and interferes the RD LO beam signal 423 with return optical signal 425 from the second optical receiver 424. In this respect, the DH receive path (e.g., 412, 414) and the RD receive path (e.g., 422, 424) receive and process their respective return optical signals, concurrently. In this respect, the range-Doppler receiver system 420 can simultaneous measure the target range and instantaneous frequency (or Doppler velocity) of a target.

FIG. 5 conceptually illustrates an example of a range Doppler receiver system 500 in accordance with one or more implementations of the subject technology. The range Doppler receiver system 500 is a front view of the ladar transceiver system 400 depicted in FIG. 4. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

As illustrated in FIG. 5, the range Doppler receiver system 500 includes the first optical receiver 414, the second optical receiver 424, and the optical transmitter 404. The size of the DH transmit beam, and its associated telescope (e.g., 404), is typically much smaller than the DH receiving telescope (e.g., 414). For example, the optical transmitter 404 can have a diameter in a range of 1 cm to about 3 cm, whereas the first optical receiver 414 can have a diameter in a range of 10 cm to 30 cm. In some aspects, the optical transmitter 404 can have a diameter of about 2.5 cm.

The size of the RD receiver telescope (e.g., 424) need not be any larger than the DH transmit telescope (e.g., 404). This is because, for diffuse targets, the received optical field is speckled. Furthermore, when the target is unresolved and in the far-field of the transmitter, the size of these speckles matches the size of the transmit beam. In some aspects, the optimal size of a single-pixel coherent receiver may be one that is matched to the speckle size. Consequently, a larger coherent RD receiver may not improve signal strength. The second optical receiver 424 can yield a similar resolution as that of the optical transmitter 404 for a given distance and wavelength when the second optical receiver 424 corresponds to the size of the optical transmitter 404.

In some implementations, the second optical receiver 424 has a diameter in a range of 1 cm to 3 cm, whereas the first optical receiver 414 has a diameter in a range of 10 cm to 30 cm. The ratio of these two diameters is on the order of the number of pixels, in one dimension, in the DH image, which is typically between 10 and 1000. This means that the wideband receiver (e.g., 424) diameter can be 10 to 1000 times smaller than the larger DH receiver telescope (e.g., 414). The first optical receiver 414 can have a diameter in a range of 100 cm to 300 cm in some implementations, or a diameter in a range of 1 cm to 3 cm in other implementations.

For a given distance to a target and laser wavelength of the transmit optical signal, the receiver DH aperture of the first optical receiver 414 can provide a resolution in a range of 5 mm to 15 mm at telescope diameters of 30 cm and 10 cm, respectively. The resolution, r, can be expressed as:

$$r = \frac{\lambda z}{D} \qquad \text{Eq. (1)}$$

Where $\lambda$ is the laser wavelength, z is the distance to the target, and D is the diameter of the transmitter aperture. At the same distance and wavelength, the receiver RD aperture of the second optical receiver 424 can provide a resolution in a range of 60 mm to 150 mm at telescope diameters of 2.5 cm and 1 cm, respectively.

Figure 6:
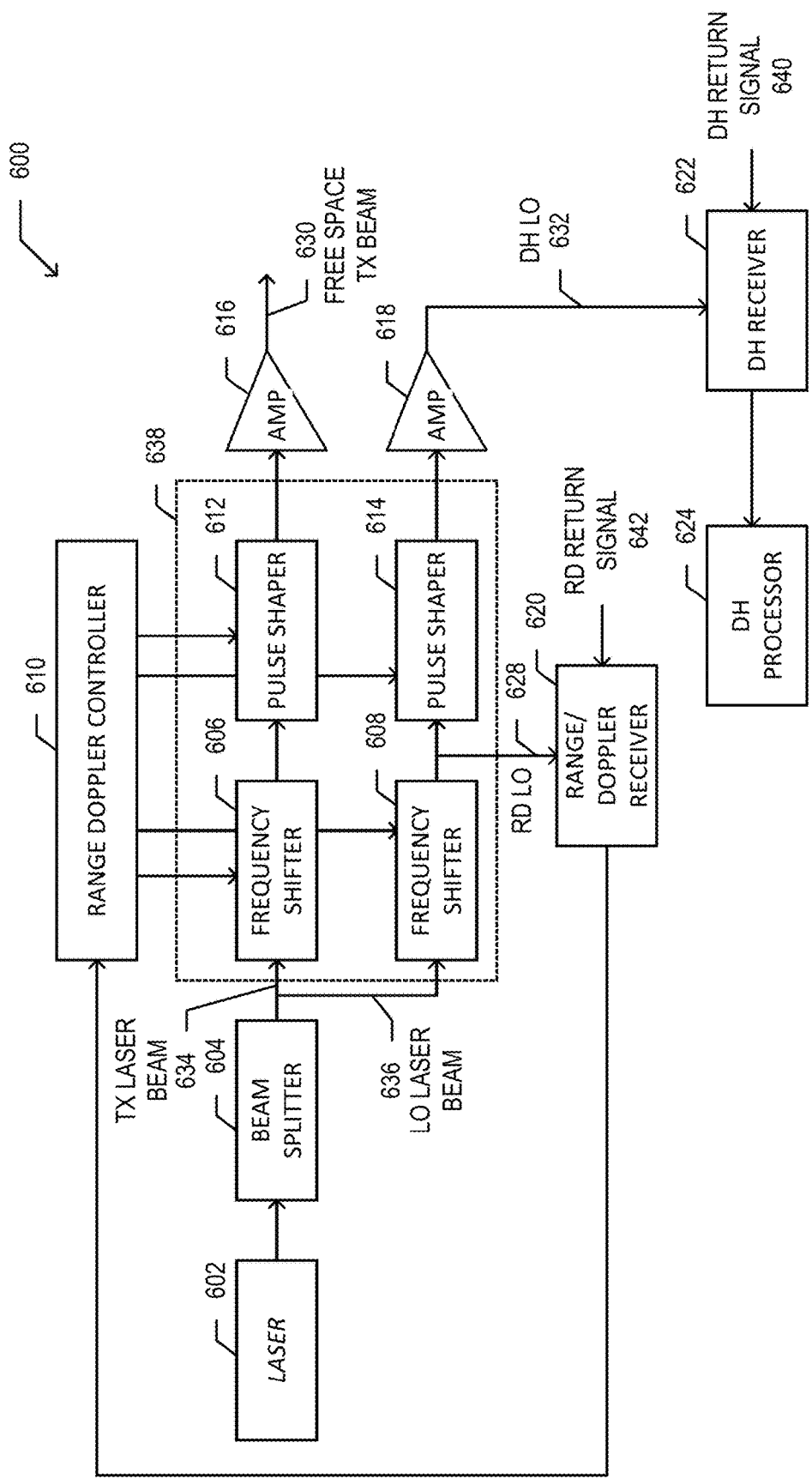
FIG. 6 illustrates a block diagram of an example of a digital holography range Doppler transceiver system in accordance with one or more implementations of the subject technology.

FIG. 6 illustrates a block diagram of an example of a digital holography range Doppler transceiver system 600 in accordance with one or more implementations of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The combined digital holography and range Doppler transceiver system 600 includes a laser source 602, a beam splitter 604, a frequency shifter 606, a pulse shaper 612, and an amplifier 616 on a transmit path of the digital holography range Doppler transceiver system 600. The digital holography range Doppler transceiver system 600 also includes a frequency shifter 608, a pulse shaper 614 and an amplifier 618 on a first local oscillator path of the digital holography range Doppler transceiver system 600. The digital holography range Doppler transceiver system 600 also includes a DH receiver 622 and a DH processor 624 on a DH receive path of the digital holography range Doppler transceiver system 600. The digital holography range Doppler transceiver system 600 also includes a RD receiver 620 and a RD controller 610 on a RD receive path of the digital holography range Doppler transceiver system 600. In one or more implementations, the DH receiver 622 may include a high-speed digital camera. The DH processor 624 may include a computer system to receive and process images from the DH receiver 622.

In operation, the laser source 602 generates an optical signal, such as a CW laser beam, from the laser source 602. In this example, the digital holography imaging system 600 employs a single laser source 602, where the frequency of the optical signal of the laser source 602 is held constant. In other implementations, the frequency of the optical signal of the laser source 602 may vary over time (or non-constant over time). The constant frequency laser signal (namely, the optical signal of the laser source 602) serves as a reference signal for the coherent data combination. As depicted in FIG. 6, part of optical signal of the laser source 602 is divided (or split off) by the beam splitter 604 such that a first optical signal 634 can serve as the free space transmit beam signal 630 and a second optical signal 636 can serve as a local oscillator reference beam for both DH and RD functions (e.g., 628, 632).

The output of the laser source 602, namely the first optical signal 634, is transmitted to a target (not shown) through an optical processing subsystem 638, and may be amplified using an amplifier 616 before being transmitted. The target is flood-illuminated, and scattered electromagnetic radiation from the target is returned and received by imaging optics (e.g., 414, 424) having one or more lenses. In some aspects, the optical processing subsystem 638 includes the frequency shifters 606 and 608 and pulse shapers 612 and 614.

In some implementations, the frequency shifter 606 may apply frequency shifting to the transmit pulse, and the amplifier 616 may amplify the transmit pulse into a free space transmit beam signal 630 for transmission to a target. In other implementations, the first optical signal 634 is fed to a wideband modulator, such as the frequency shifter 606, which imposes a wideband microwave signal onto the first optical signal 634. The modulated signal is shaped by the pulse shaper 612 and then amplified by a wideband amplifier, such as the amplifier 616, and directed out through the transmit optics (e.g., 404) to the target. In one or more implementations, each of the amplifiers 616 and 618 may include one or more amplifiers. In some aspects, the amplifiers 616 and 618 may be erbium-doped fiber amplifiers. In some aspects, the pulse shapers 612 and 614 may be configured to shape the respective optical signals into a square-shaped signal having a pulse width in a range of 200 ns to 400 ns, or a pulse width of hundreds of microseconds.

In some implementations, the LO signals (e.g., DH LO beam signal 632, RD LO beam signal 628) may be mixed with a respective return optical signal (e.g., DH return optical signal 640, RD return optical signal 642) from the target using a single photonic crystal grating. In some implementations, the DH LO beam signal 632 may be directed through a first optical fiber toward the DH receiver 622, and the RD LO beam signal 628 may be directed through a second optical fiber toward the RD receiver 620.

In various aspects, the detectors in the RD receiver 620 and/or the DH receiver 622 may be implemented with avalanche photo-detectors (APDs) or Geiger-mode avalanche photo-detectors (GmAPDs). The APDs may include a material choice and/or purposely designed structures to exhibit ultra-low excess noise values under coherent detection operation.

In some aspects, high-speed high-dynamic range frequency shifters may be part of the digital holography range Doppler transceiver system 600 to match the color (or offset frequency) between the LO signal and the return optical signal, in which detectors on the RD receiver 620 are configured to detect electromagnetic radiation by coherent detection at the particular offset frequency.

Each of the frequency shifters 606 and 608 may include one or more fiber-coupled acoustical optical modulators, which can be used to globally tune the frequency of the free-space transmit beam signal 630 and the RD/DH LO beam signals (e.g., 628, 632), respectively. In some aspects, the frequency shifter 606 includes a high-speed phase modulator with serrodyne RF drive (not shown) to enable frequency tuning of the TX laser beam 634. The frequency shifter 608 may include one or more fiber-coupled frequency modulators, which can be used to globally tune the frequency of the RD LO beam signal 628 to match the color (or frequency) of the RD return optical signal 642.

Following amplification by the amplifier 618, the DH LO beam signal 632 co-propagates with the DH return optical signal 640 to the field-of-view plane. The DH return optical signal 640 is coupled to the DH processor 624 via the DH receiver 622 for data acquisition and processing purposes. In operation, the DH return optical signal 640 enters the DH receiver 622 and combines with the DH LO beam signal 632. The mixed beam (comprising the DH LO beam signal 632 and the DH return optical signal 640) is detected by the DH receiver 622 and the image data is transferred to the DH processor 624. The DH return optical signal 640 may be the return electromagnetic radiation scattered from a target illuminated by the transmitted free space TX beam signal 630 that originated on the transmit path of the digital holography range Doppler transceiver system 600. electromagnetic radiation generated by the laser source 602 is generally transmitted to the target over an angular extent. electromagnetic radiation scattered from the target returns along the same general path, is concurrently captured by imaging optics on the DH and RD receive paths, and can propagate to a field-of-view plane such that an image of the target is formed at the field-of-view plane of the DH receiver 622.

In some implementations, a Doppler-shifted target return optical signal (namely the RD return optical signal 642) is optically coaligned with a Doppler-shifted optical LO signal (namely the RD LO beam signal 628). The output of the frequency shifter 608 (e.g., encoded electromagnetic radiation beams having adjusted optical properties for the RD LO beam signal 628) is then input to the RD receiver 620 that mixes the RD LO beam signal 628 with the RD return optical signal 642 to form a mixed beam that is input to one or more coherent photodetectors of the RD receiver 620.

The RD return optical signal 642 is received by a balanced receiver of the RD receiver 620. In some aspects, the RD LO beam signal 628 and the RD return optical signal 642 are fed into a wideband optical mixer, and the heterodyne detected intermediate frequency (IF) output is fed to the balanced receiver of the RD receiver 620. Balanced receivers, such as the RD receiver 620, can consist of anti-parallel photodiodes, which are widely used in coherent receivers owing to their capacity to suppress laser relative intensity noise (RIN) and the amplified spontaneous emission noise (ASE) from erbium-doped fiber amplifiers. This enables analog links to achieve short noise-limited performance at high optical powers, which significantly improves the link gain, spurious-free dynamic range, and noise figure. To realize these advantages, it is important to have balanced photodetectors with high saturation photocurrents. Since optimal performance is achieved when both receiver channels are perfectly matched electrically and optically, it is beneficial to monolithically integrate the receiver components, particularly the two photodiodes.

The optical train along the RD receive path also includes a feedback loop for the real-time or post-processing compensation of the target range and target velocity errors that the receiver introduces. The RD receiver 620 may generate RD receiver data that includes time and frequency offsets delay between the transmitted and received pulses. In this respect, the RD receiver 620 provides the RD receiver data to the RD controller 610, and the RD controller 610 uses the time and frequency offsets for the DH LO beam signal 632, such that the DH LO beam signal 632 can be aligned to the next signal pulse in both time and frequency domains. In some aspects, the RD controller 610 provides control signals to the frequency shifters 606 and 608 and to the pulse shapers 612 and 614. In some examples, the control signals provided by the RD controller 610 can include, or be generated based at least on, the time and frequency offsets from the RD receiver data.

Figure 7:
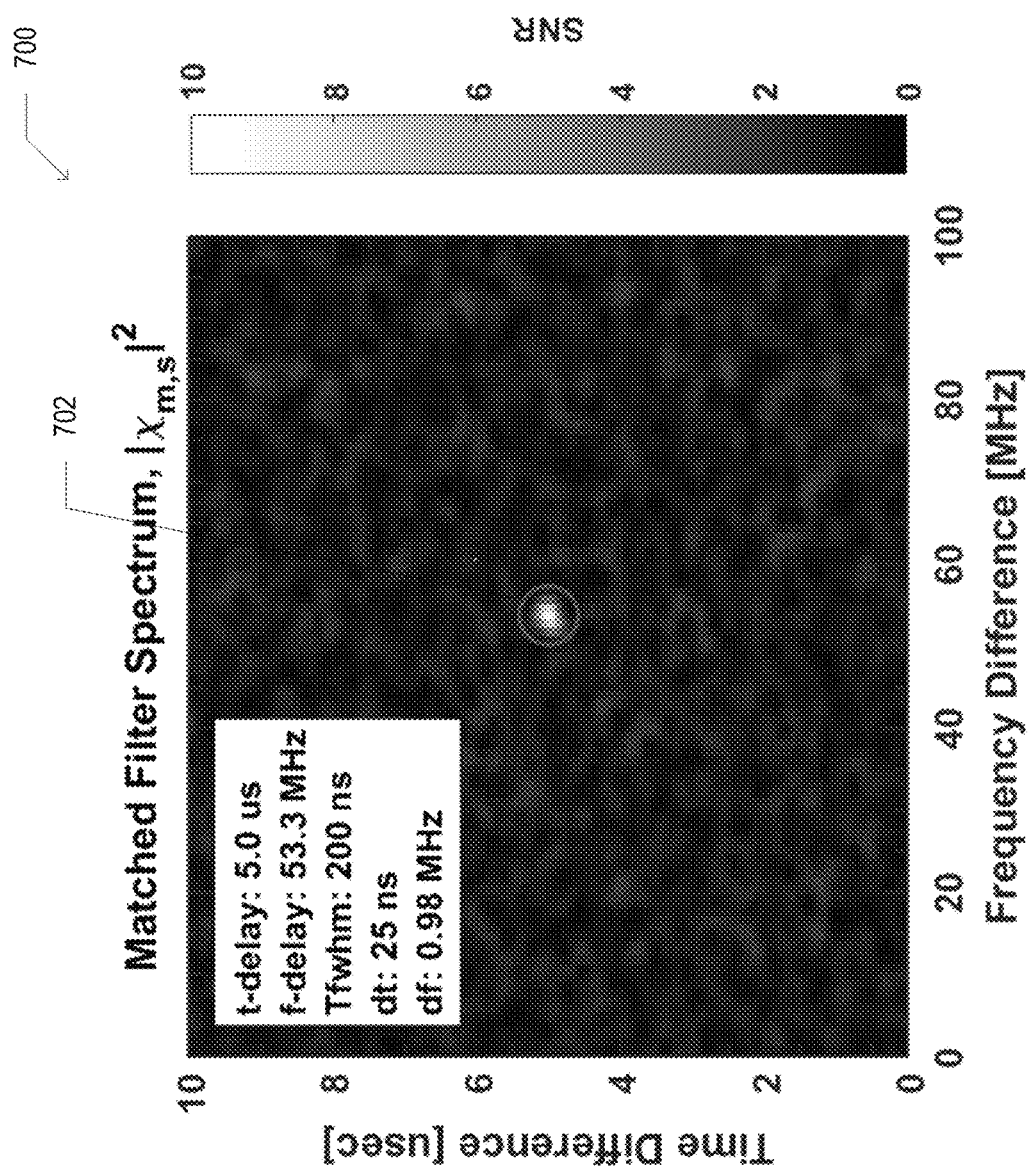
FIG. 7 illustrates a two-dimensional plot of an example wideband signal spectrogram in accordance with one or more implementations of the subject technology.

FIG. 7 illustrates a two-dimensional plot of an example wideband signal spectrogram 700 in accordance with one or more implementations of the subject technology. The plot contains wideband receiver data resulting from processing a wideband receiver signal pulse (namely the RD return optical signal 642 of FIG. 6). The wideband signal spectrogram 700 depicts a time and frequency delay between transmitted and received pulses. As depicted in FIG. 7, the wideband signal spectrogram 700 includes a time-frequency coordinate of the target (e.g., 702). In this respect, the wideband signal spectrogram 700 may represent a matched filter spectrum that is an optimal linear filter for maximizing a signal-to-noise ratio (SNR) of the reflected signal (namely the RD return optical signal 642) at the time-frequency coordinate 702. The wideband receiver data may be used to generate control signals containing time and frequency offsets for the DH LO beam signal 632, such that the DH LO beam signal 632 is aligned to the next signal pulse in both time and frequency domains.

Figure 8:
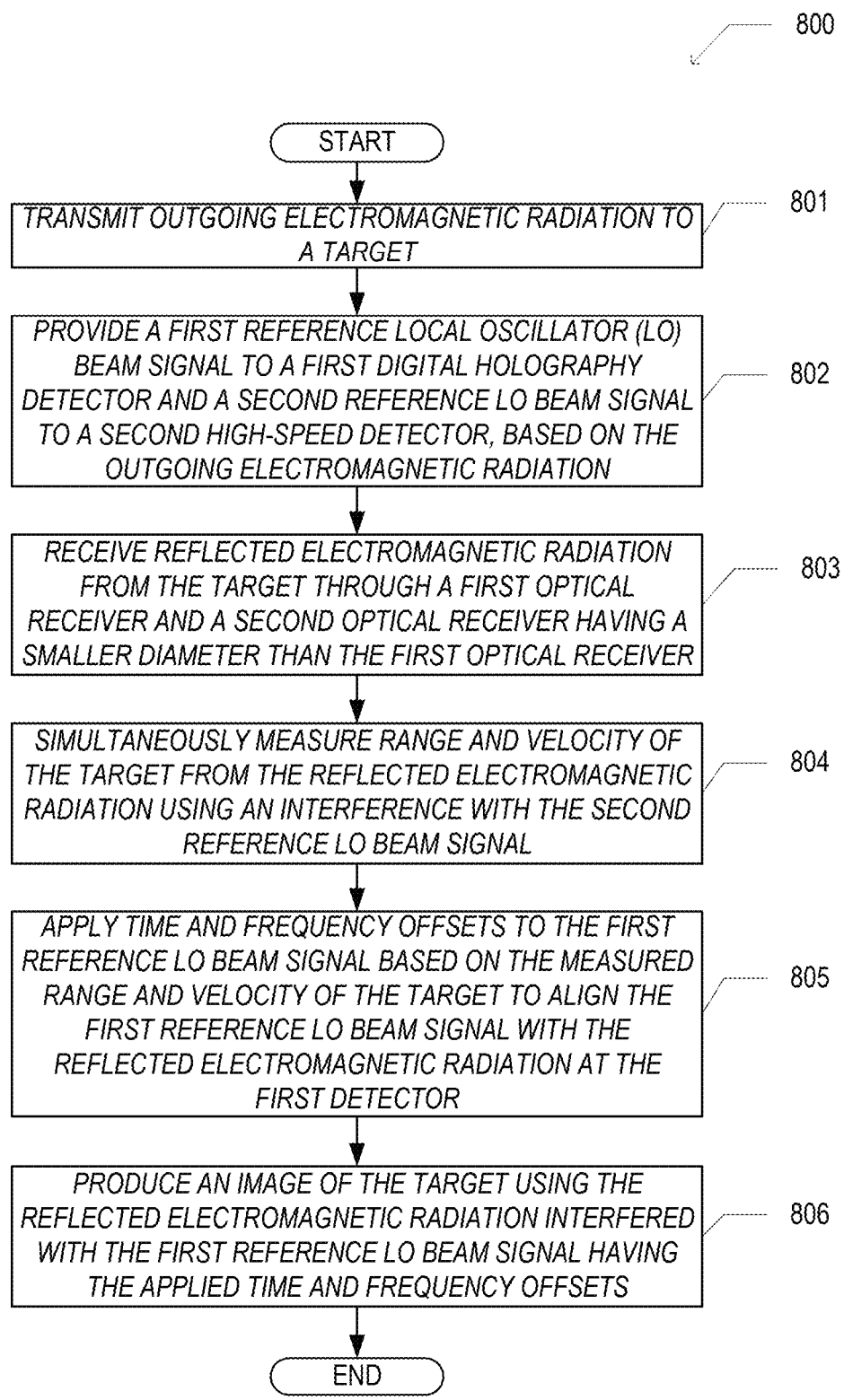
FIG. 8 illustrates a block diagram of a process for a digital holography range Doppler receiver according to one or more implementations of the subject technology.

FIG. 8 illustrates a block diagram of a process 800 for a digital holography range Doppler receiver according to one or more implementations of the subject technology. For explanatory purposes, the process 800 is primarily described herein with reference to the ladar transceiver system 400 of FIG. 4. However, the process 800 is not limited to the ladar transceiver system 400, and one or more blocks (or operations) of the process 800 may be performed by one or more other components or circuits of the ladar transceiver system 400, such as the digital holography transceiver subsystem 410 and the range-Doppler subsystem 420. The process 800 also may be performed by one or more components or circuits of the digital holography range Doppler transceiver system 600. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

The process 800 starts at step 801, where outgoing electromagnetic radiation is transmitted to a target. Next, at step 802, a first reference LO beam signal is provided to a first detector and a second reference LO beam signal is provided to a second detector, based on the outgoing electromagnetic radiation. Subsequently, at step 803, reflected electromagnetic radiation is received from the target through a first optical receiver and a second optical receiver having a smaller diameter than the first optical receiver. Next, at step 804, range and velocity of the target are simultaneously measured from the reflected electromagnetic radiation using an interference with the second reference LO beam signal. Subsequently, at step 805, time and frequency offsets are applied to the first reference LO beam signal based on the measured range and velocity of the target to align the first reference LO beam signal with the reflected electromagnetic radiation at the first detector. Next, at step 806, a coherent image of the target is produced using the reflected electromagnetic radiation interfered with the first reference LO beam signal having the applied time and frequency offsets.

The process 800 may include steps for interfering a portion of the reflected electromagnetic radiation received at the second detector with the second reference LO beam signal to form a mixed beam, generating receiver data that includes the time and frequency offsets from the mixed beam, and providing the receiver data as feedback for controlling the first reference LO beam signal and the second reference LO beam signal.

Figure 9:
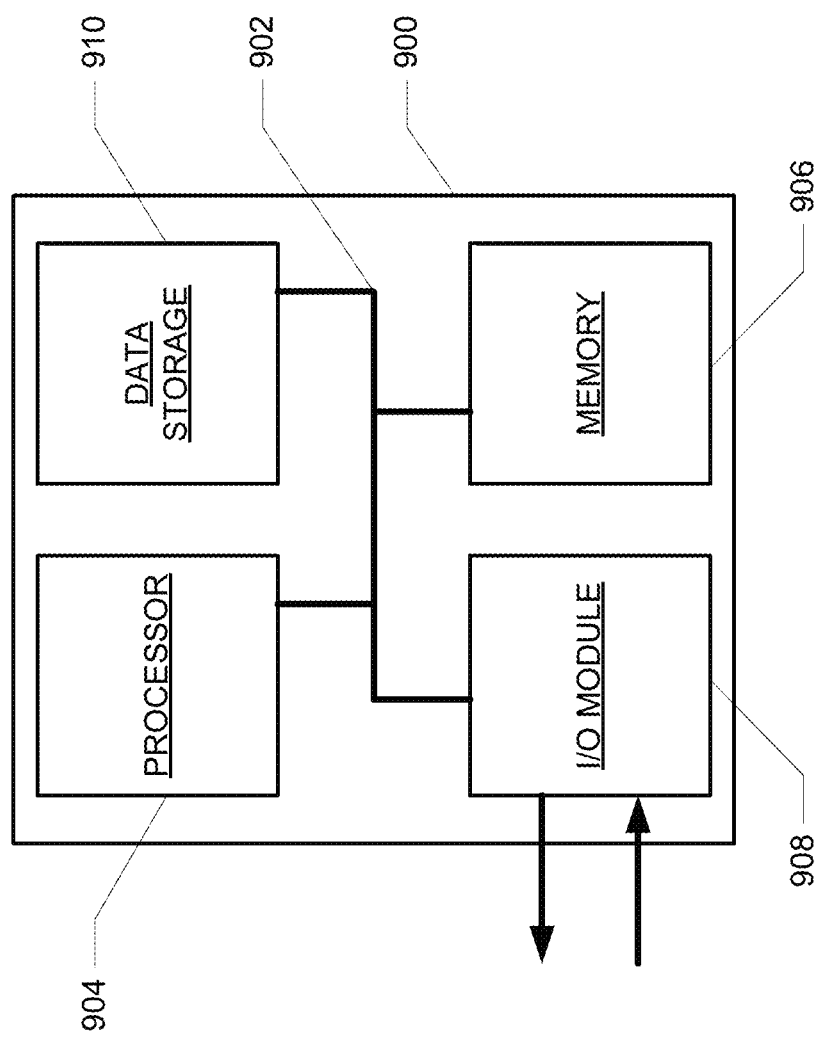
FIG. 9 is a block diagram that illustrates a computer system upon which an embodiment of the subject disclosure may be implemented.

FIG. 9 is a block diagram that illustrates a computer system 900 upon which an embodiment of the subject disclosure may be implemented. Computer system 900 includes a bus 902 or other communication mechanism for communicating information, and a processor 904 coupled with bus 902 for processing information. Computer system 900 also includes a memory 906, such as a random access memory ("RAM") or other dynamic storage device, coupled to bus 902 for storing information and instructions to be executed by processor 904. Memory 906 may also be used for storing temporary variables or other intermediate information during execution of instructions by processor 904. Computer system 900 further includes a data storage device 910, such as a magnetic disk or optical disk, coupled to bus 902 for storing information and instructions.

Computer system 900 may be coupled via I/O module 908 to a display device (not illustrated), such as a liquid crystal display ("LCD"), a light-emitting diode ("LED") display, or a combination thereof, for displaying information to a computer user. An input device, such as, for example, a keyboard or a mouse may also be coupled to computer system 900 via I/O module 908 for communicating information and command selections to processor 904.

According to one implementation of the subject disclosure, generating and configuring a plurality of beams with an antenna system may be performed by a computer system 900 in response to processor 904 executing one or more sequences of one or more instructions contained in memory 906. Such instructions may be read into memory 906 from another machine-readable medium, such as data storage device 910. Execution of the sequences of instructions contained in main memory 906 causes processor 904 to perform the process steps described herein. One or more processors in a multi-processing arrangement may also be employed to execute the sequences of instructions contained in memory 906. In alternative implementations, hard-wired circuitry may be used in place of or in combination with software instructions to implement various implementations of the subject disclosure. Thus, implementations of the subject disclosure are not limited to any specific combination of hardware circuitry and software.

The term "machine-readable medium" as used herein refers to any medium that participates in providing instructions to processor 904 for execution. Such a medium may take many forms, including, but not limited to, non-volatile media, volatile media, and transmission media. Non-volatile media include, for example, optical or magnetic disks, such as data storage device 910. Volatile media include dynamic memory, such as memory 906. Transmission media include coaxial cables, copper wire, and fiber optics, including the wires that comprise bus 902. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The description of the subject technology is provided to enable any person skilled in the art to practice the various embodiments described herein. While the subject technology has been particularly described with reference to the various figures and embodiments, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these embodiments may be readily apparent to those skilled in the art, and generic principles defined herein may be applied to other embodiments. Thus, many changes and modifications may be made to the subject technology, by one having ordinary skill in the art, without departing from the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various embodiments described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. An optical system, comprising:
   a digital holography (DH) system comprising a first optical receiver and a first detector, wherein the DH system is configured to:
      provide a first reference local oscillator (LO) beam signal to the first detector, and
      receive reflected electromagnetic radiation from a target at the first detector through the first optical receiver; and
   a range Doppler (RD) system comprising a second detector, wherein the RD system is configured to:
      provide a second reference LO beam signal to the second detector,
      receive the reflected electromagnetic radiation from the target at the second detector, determine simultaneously range and velocity of the target from the reflected electromagnetic radiation using an interference with the second reference LO beam signal, and apply time and frequency offsets to the first reference LO beam signal based on the range and velocity of the target to align the first reference LO beam signal with the reflected electromagnetic radiation at the first detector, and wherein the DH system produces an image of the target using the reflected electromagnetic radiation and the first reference LO beam signal having the applied time and frequency offsets.

2. The optical system of claim 1, wherein the DH system further comprises an optical signal source configured to generate outgoing electromagnetic radiation, and an optical transmitter configured to transmit the outgoing electromagnetic radiation to the target, wherein the optical signal source is optically coupled to the optical transmitter.

3. The optical system of claim 2, wherein the second detector is optically coupled to the optical transmitter so that the second detector shares the optical transmitter used by the optical signal source.

4. The optical system of claim 2, wherein the RD system further comprises a second optical receiver having a diameter smaller than that of the first optical receiver, and wherein the second detector is optically coupled to the second optical receiver.

5. The optical system of claim 4, wherein the optical transmitter includes a first telescope having a diameter in a range of 1 cm to 3 cm, and the second optical receiver includes a second telescope having a diameter in a range of 10 cm to 30 cm.

6. The optical system of claim 4, wherein the first optical receiver includes a first telescope having a diameter in a range of 10 cm to 30 cm, and the second optical receiver includes a second telescope having a diameter in a range of 1 cm to 3 cm.

7. The optical system of claim 4, wherein the second detector is configured to receive the second reference LO beam signal and to interfere the second reference LO beam signal with the reflected electromagnetic radiation from the second optical receiver.

8. The optical system of claim 1, wherein the second detector is optically coupled to the first optical receiver so that the second detector shares the first optical receiver used by the first detector.

9. The optical system of claim 1, wherein the first detector is configured to receive the first reference LO beam signal and to interfere the first reference LO beam signal with the reflected electromagnetic radiation from the first optical receiver.

10. The optical system of claim 1, wherein the first detector is configured to utilize the first reference LO beam signal to correspond the reflected electromagnetic radiation at the first detector with the range and velocity of the target.

11. The optical system of claim 1, wherein the DH system and the RD system receive and process respective portions of the reflected electromagnetic radiation, concurrently.

12. The optical system of claim 1, wherein the second detector is configured to generate RD receiver data that includes time and frequency offsets delay between a transmitted outgoing optical signal pulse and a received optical signal pulse of the reflected electromagnetic radiation.

13. The optical system of claim 12, further comprising a RD controller coupled to the RD system, wherein the second detector is configured to provide the RD receiver data to the RD controller, and the RD controller is configured to apply the time and frequency offsets delay to the first reference LO beam signal so that the first reference LO beam signal is aligned to a next outgoing optical signal pulse in both time and frequency domains.

14. The optical system of claim 1, wherein the second detector includes a balanced receiver or a single-element detector.

15. A method, comprising:
transmitting outgoing electromagnetic radiation to a target;
providing a first reference local oscillator (LO) beam signal to a first detector and a second reference LO beam signal to a second detector, based on the outgoing electromagnetic radiation;
receiving reflected electromagnetic radiation from the target at the first detector through a first optical receiver and at the second detector through a second optical receiver having a diameter smaller than that of the first optical receiver;
determining simultaneously range and velocity of the target from the reflected electromagnetic radiation using an interference with the second reference LO beam signal;
applying time and frequency offsets to the first reference LO beam signal based on the range and velocity of the target to align the first reference LO beam signal with the reflected electromagnetic radiation at the first detector; and
producing an image of the target using the reflected electromagnetic radiation interfered with the first reference LO beam signal having the applied time and frequency offsets.

16. The method of claim 15, further comprising:
interfering a portion of the reflected electromagnetic radiation received at the second detector with the second reference LO beam signal to form a mixed beam;
generating receiver data that includes the time and frequency offsets from the mixed beam; and
providing the receiver data as feedback for controlling the first reference LO beam signal and the second reference LO beam signal.

17. An optical transceiver, comprising:
an optical transmitter configured to generate outgoing electromagnetic radiation and transmit the outgoing electromagnetic radiation to a target;
a first optical receiver;
a first optical detection system optically coupled to the first optical receiver and configured to:
receive a first reference local oscillator (LO) beam signal;
receive reflected electromagnetic radiation from the target through the first optical receiver;
interfere the reflected electromagnetic radiation with a first reference LO beam signal;
a second optical receiver;
a second optical detection system optically coupled to the second optical receiver and configured to:
receive the reflected electromagnetic radiation from the target through the second optical receiver;
measure simultaneously range and velocity of the target from the reflected electromagnetic radiation using an interference with a second reference LO beam signal;

generate receiver data comprising time and frequency offsets based on the measured range and velocity of the target; and a controller coupled to the second optical detection system and configured to:

apply the time and frequency offsets from the receiver data to the first reference LO beam signal to align the first reference LO beam signal with the reflected electromagnetic radiation, wherein the first optical detection system produces an image of the target using the reflected electromagnetic radiation interfered with the first reference LO beam signal having the applied time and frequency offsets.

18. The optical transceiver of claim 17, wherein second optical detection system is a balanced receiver.

19. The optical transceiver of claim 17, wherein second optical detection system is a single-element detector.

20. The optical transceiver of claim 17, wherein the second optical receiver includes a telescope that has a smaller aperture size than that of the first optical receiver.

* * * * *